(12) United States Patent
Craul

(10) Patent No.: US 7,051,476 B1
(45) Date of Patent: May 30, 2006

(54) PLANT BENCH FOR USE IN A GREENHOUSE OR NURSERY STRUCTURE, AND A GREENHOUSE OR NURSERY STRUCTURE INCLUDING THE PLANT BENCH

(76) Inventor: Donald R. Craul, P.O. Box 648, Lewisburg, PA (US) 17837

( * ) Notice: Subject to any disclaimer, the term of this patent is extended or adjusted under 35 U.S.C. 154(b) by 0 days.

(21) Appl. No.: 11/068,926

(22) Filed: Mar. 2, 2005

(51) Int. Cl.
*A01G 9/00* (2006.01)

(52) U.S. Cl. .............................................. 47/18; 47/17

(58) Field of Classification Search .................... 47/17, 47/18, 65.5, 39, 47, 48; 108/17
See application file for complete search history.

(56) References Cited

U.S. PATENT DOCUMENTS

| | | | | |
|---|---|---|---|---|
| 191,183 | A * | 5/1877 | Sampson | 108/17 |
| 435,470 | A | 9/1890 | Weston | |
| 589,677 | A | 9/1897 | Witte | |
| 626,513 | A | 6/1899 | Varns | |
| 644,247 | A * | 2/1900 | Henley | 108/17 |
| 665,451 | A | 1/1901 | Marshall | |
| 1,669,065 | A * | 5/1928 | Minton | 294/161 |
| 1,753,980 | A * | 4/1930 | Baumgartner | 47/17 |
| 1,939,015 | A * | 12/1933 | McLellan | 47/17 |
| 2,110,466 | A * | 3/1938 | Louis | 108/12 |
| 2,406,436 | A * | 8/1946 | Peter | 108/17 |
| 2,766,812 | A * | 10/1956 | Schrader | 297/141 |
| 2,913,122 | A | 11/1959 | Lomas | |
| 2,957,582 | A | 10/1960 | Lusk | |
| 4,837,971 | A * | 6/1989 | Visser | 47/17 |
| 4,901,471 | A | 2/1990 | van den Top | |
| 5,856,190 | A | 1/1999 | Iwai et al. | |
| 6,412,216 | B1 * | 7/2002 | Harrison | 47/18 |

FOREIGN PATENT DOCUMENTS

JP    5-153876    6/1993

* cited by examiner

*Primary Examiner*—Francis T. Palo
(74) *Attorney, Agent, or Firm*—Wenderoth, Lind & Ponack, L.L.P.

(57) ABSTRACT

A plant bench device used in a greenhouse or nursery structure can reduce its horizontal width in order to create space for aisles in the structure. Two plant bench tables are supported by suitable support structure in the greenhouse or nursery structure. The tables are supported so as to be movable between a first position in which the two bench tables can be used for the greenhouse or nursery operations, and a second position in which the two plant bench tables are at least partially superposed. This allows more effective utilization of the available space in the greenhouse or nursery structure by creating aisles when the tables are moved to the second position.

17 Claims, 8 Drawing Sheets

Fig. 6
(a) 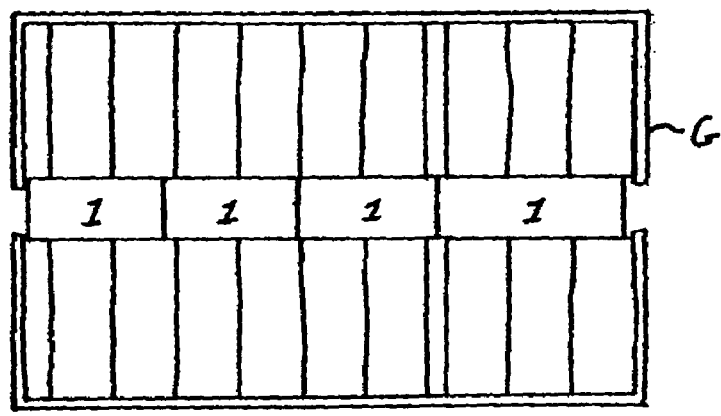
(b) 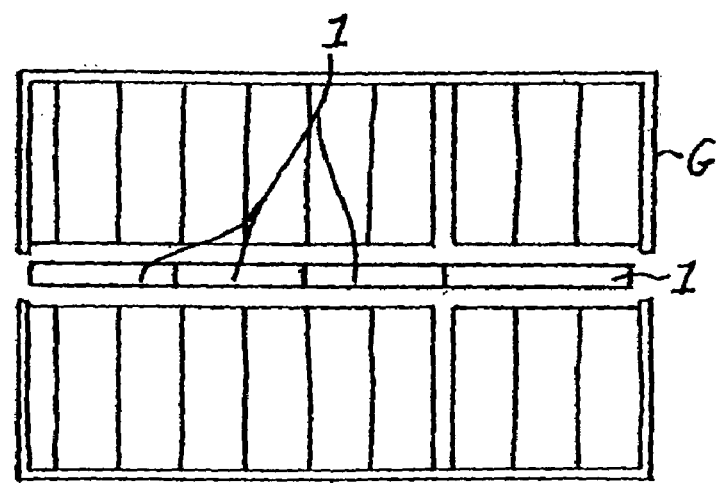

PLANT BENCH FOR USE IN A GREENHOUSE OR NURSERY STRUCTURE, AND A GREENHOUSE OR NURSERY STRUCTURE INCLUDING THE PLANT BENCH

BACKGROUND OF THE INVENTION

1. Field of the Invention

The present invention relates to benches used in raising/nurturing plants in a greenhouse or nursery, and more particularly to plant benches that improve the space efficiency of the greenhouse or nursery.

2. State of the Prior Art

Benches are used in greenhouses or nurseries in order to support seedlings. Typically, the benches are simple wooden structures placed in rows in the greenhouse or nursery, with aisles between them to allow for access. Note for example FIG. 1, illustrating three different types of layouts of benches in greenhouse or nursery structures.

As can be appreciated from the drawing figures, greenhouses lose a great deal of floor space due to the necessity of walkways or aisles between the benches. In FIGS. 1(a) and (b) the illustrated benches are fixed. The benches in FIG. 1(b) use the available space more efficiently, but still only achieve 69% space efficiency. As can be seen from FIG. 1(c), movable benches can allow for greater space utilization by essentially moving the position of the lateral aisle by moving the benches. However, this still only achieves an 81% space efficiency. Indeed, today most greenhouses still lose between 5 to 50%, approximately, of the available floor space.

SUMMARY OF THE INVENTION

The present inventor has recognized that with the prior art greenhouse or nursery arrangements, there is still a certain amount of lost floor space due to the need for the walkways and aisles. If the space were able to be used more efficiently, costs savings could be achieved by improving the utilization efficiency of the greenhouse or nursery structure, using correspondingly less land to produce the same quantity of plants. The need for efficiently utilizing the space becomes even more important when operation costs are considered. Heating greenhouses is very expensive, and rising fuel costs only makes that more so. Open spaces in greenhouses create further waste, because automatic watering systems and fertilization and chemigation systems supply to the open spaces of the greenhouse as well as the actual spaces occupied by plants, similar to the heating, ventilation and lighting.

Accordingly, it is an object of the present invention to provide a bench for use in a greenhouse or nursery structure that will enable substantially 100% utilization of the available floor space of the structure. More particularly, it is an object of the present invention to provide such a bench for a greenhouse or nursery structure in which separate plant bench tables are rotated from a position of use into a position in which they are at least partially superposed in order to reduce the horizontal space taken up by the plant bench. This allows for essentially all of the space in the nursery structure to be filled with benches. When an aisle is needed for access to the plants supported by the benches, plant benches of the greenhouse or nursery structure employing the present invention, i.e. including the two plant bench tables that can be superposed, can be adjusted to create an aisle or aisles.

A plant bench according to the present invention includes support structure to be provided in the greenhouse or nursery structure, and two plant bench tables that are supported on the support structure. They are supported so as to be movable between a first position in which the two plant bench tables can be used for the greenhouse or nursery operations, and a second position in which the two plant bench tables are at least partially superposed. When they are in the second position, the horizontal width that is occupied by the plant bench as a whole is reduced by the superposition of the two plant bench tables. 4'×96" plant bench tables would produce two 24" aisles, one on each side, in the fully superposed position. 18" aisles would be created for benches, for example, of a 3'×96" size. For many greenhouses, this means that with the superposed position of the plant bench according to the present invention, the balance of benches in the greenhouse can be rolled into the empty spaces that are created, row by row, until the outermost benches along the wall have been serviced or maintained.

Preferably, the two plant bench tables are each supported by a member that is pivotally mounted to the support structure for movement between the first and second positions. Further, the support structure preferably comprises two spaced apart columns having the two plant bench tables between them. Preferably, the member that is pivotally mounted to the support structure includes a member on each column to support opposite ends of the two plant bench tables. The longitudinal ends of the two plant bench tables are suspended from the members so that they stay substantially horizontal during movement.

Furthermore, preferably a horizontal rod connects one of the members with the other so that both the members will pivot together. Further preferably, a mechanism is provided to pivot the members. This could include a hand crank, a motor, or perhaps, simply a connector that is engageable by a power tool.

Preferably, in the first position, the two plant bench tables are substantially adjacent and coplanar; that is, they are next to each other so that they form a bench usable for the greenhouse or nursery operations. It is not considered necessary to employ a plant bench according to the present invention as the only bench in a greenhouse or nursery structure. The building structure that defines the greenhouse or nursery area could be primarily occupied by movable plant benches. Accordingly, by use of the plant bench according to the present invention, after the tables have been moved into a superposed position, to create aisles, the remaining movable benches can be moved around for maintenance of the crop. When coordinated together with plant benches according to the present invention, substantially the entirety of the floor space can be used for the greenhouse or nursery operations. This can greatly increase the efficiency of the greenhouse or nursery operation.

BRIEF DESCRIPTION OF THE DRAWINGS

FIGS. 6(*c*) and (*d*) and views similar to FIGS. 6(*a*) and (*b*), but for a longitudinal layout.

DETAILED DESCRIPTION OF THE PREFERRED EMBODIMENT

Figure 2:
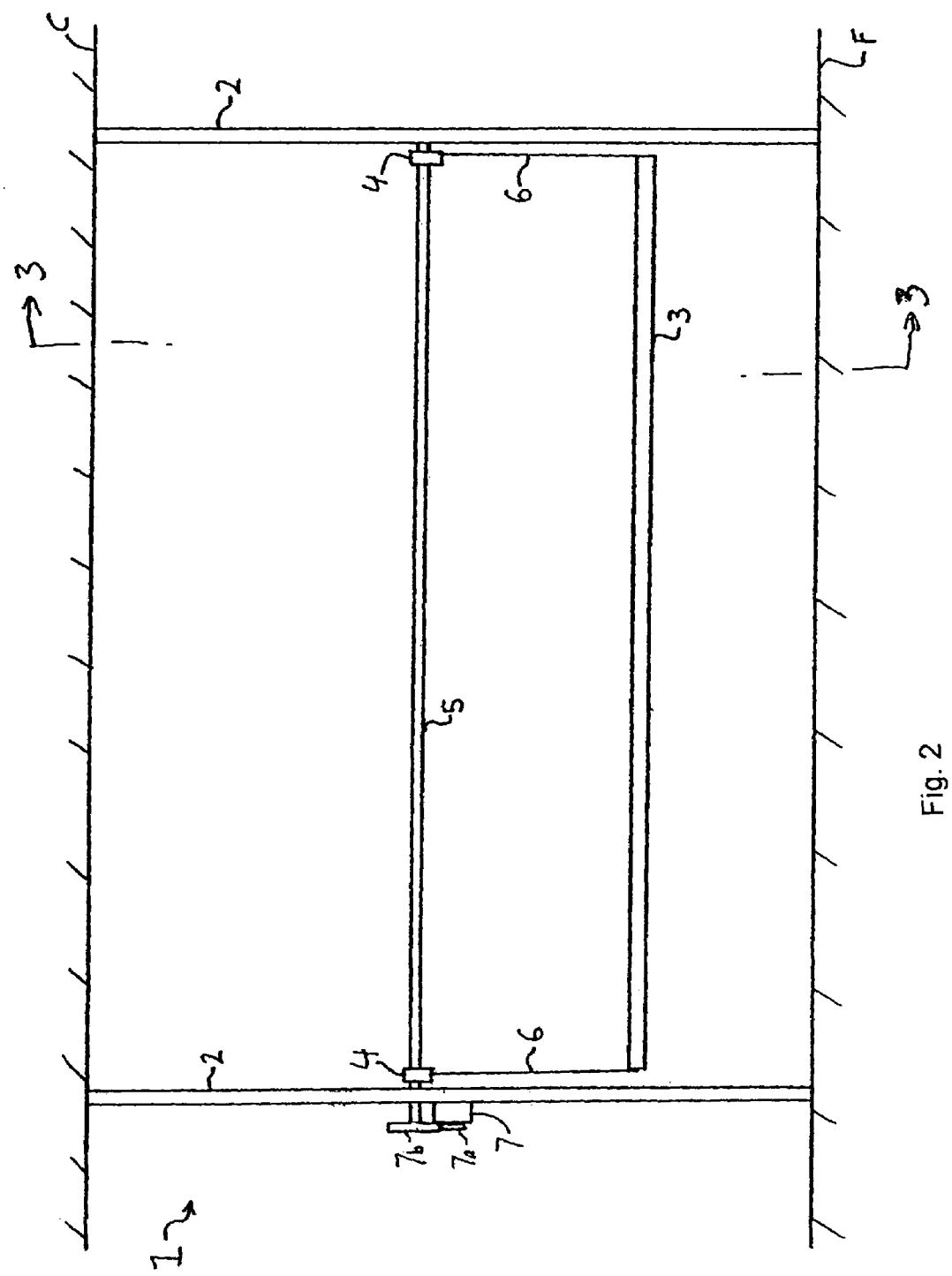
FIG. 2 is a side view of a plant bench according to the present invention.

A preferred embodiment of the present invention is primarily illustrated in FIG. 2 in schematic form. A plant bench 1, for use in a greenhouse or nursery structure, is illustrated in the drawing figure. Reference F refers to the floor of the structure, and reference C refers to a ceiling of the structure.

Figure 3:
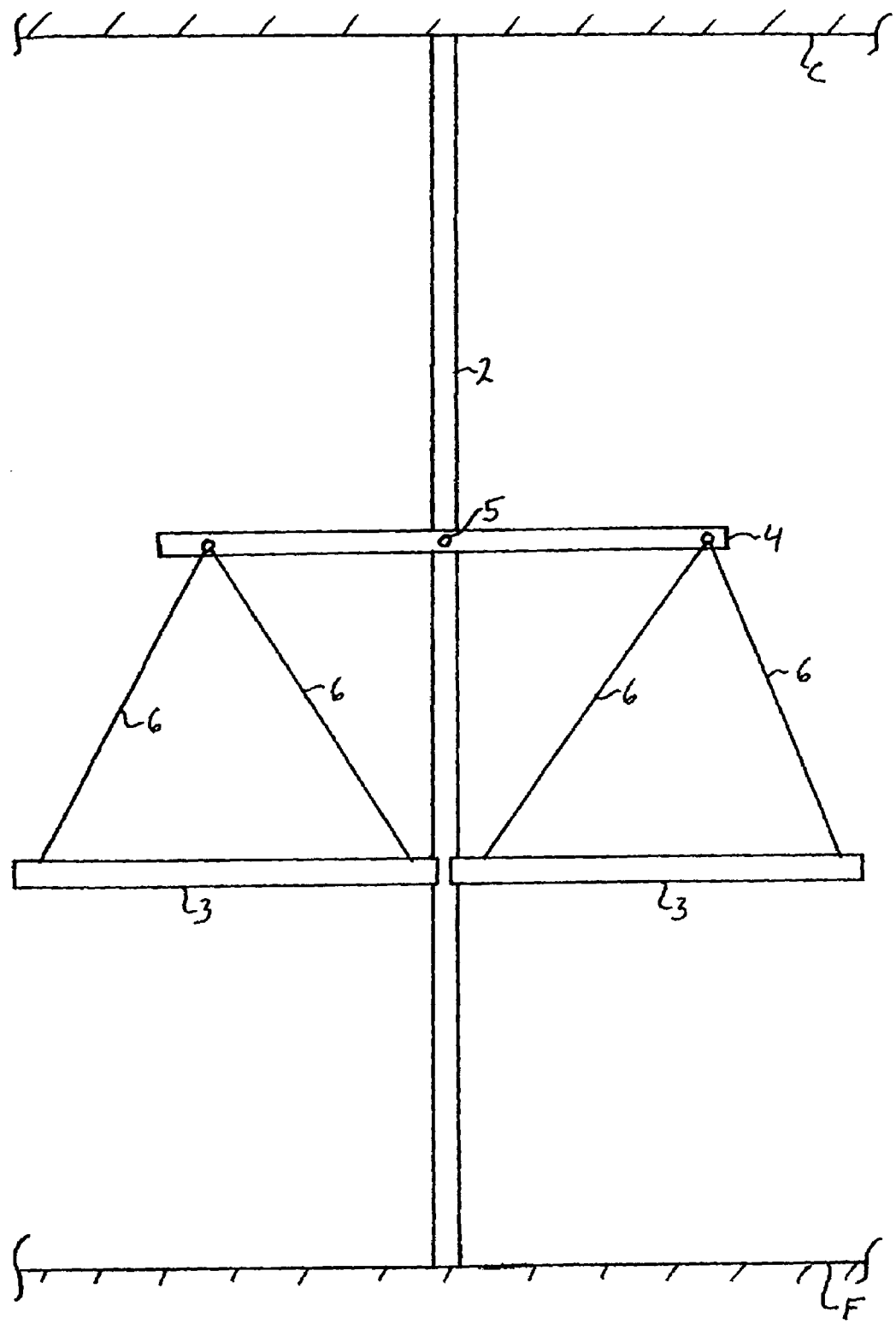
FIG. 3 is a simplified cross sectional view taken along line 3—3 of FIG. 2.
Figure 4:
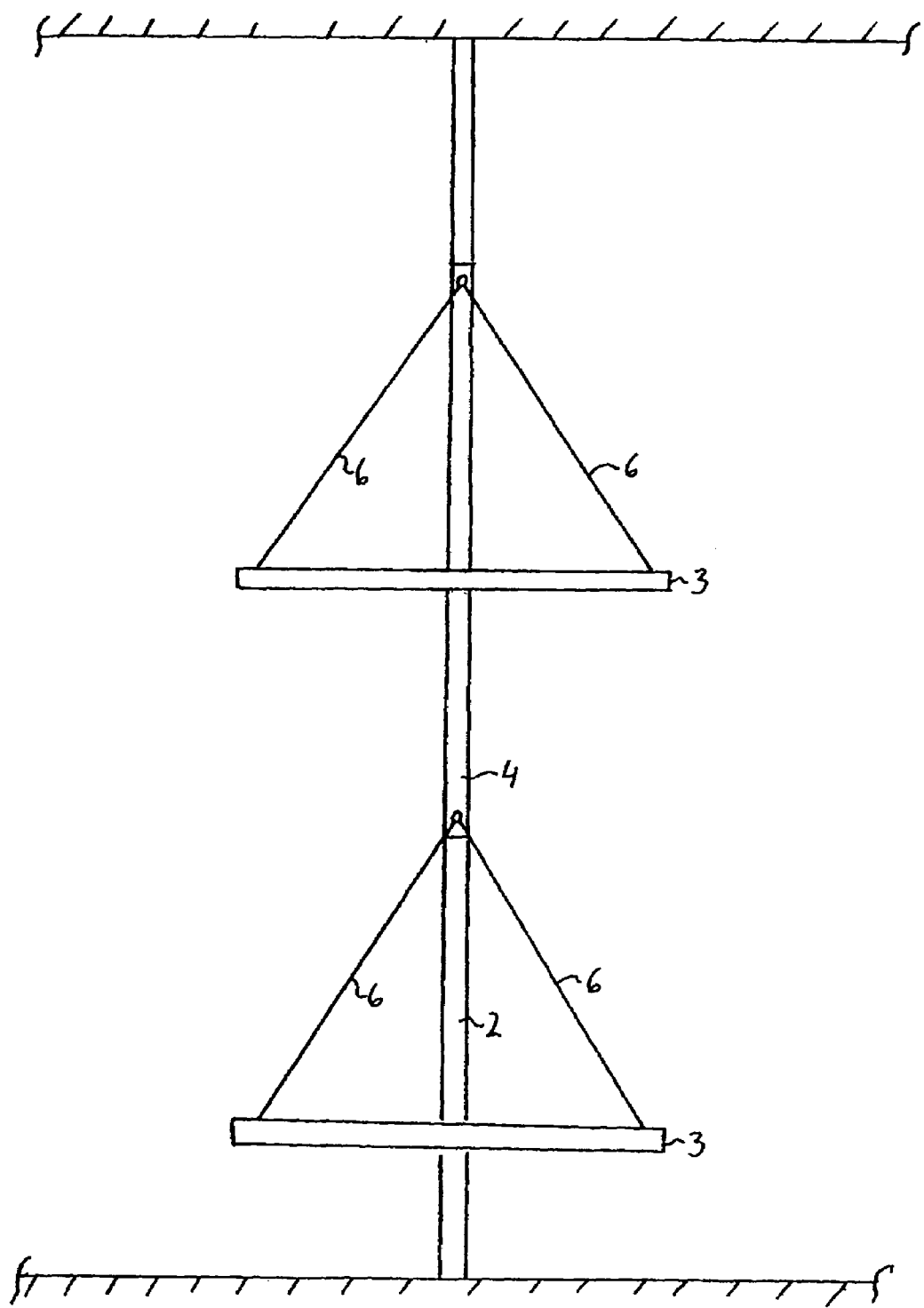
FIG. 4 is a view similar to FIG. 3, but illustrating the plant bench according to the present invention with superposed bench tables.

Support structure forming a part of the plant bench 1 includes two columns 2 fixed between the floor and ceiling. Suspended between them are two plant bench tables 3 that are supported on the columns 2 so as to be movable between a first position, illustrated in FIG. 3, and a second position shown in FIG. 4. The position of FIG. 3 represents a position of use for greenhouse or nursery operations, i.e. growing seedlings or other plants. The position of FIG. 4 shows the tables 3 moved to a completely superposed position. As can be readily seen by comparing these drawing figures, this effectively reduces the horizontal width of the plant bench as a whole by 50%.

Figure 1:
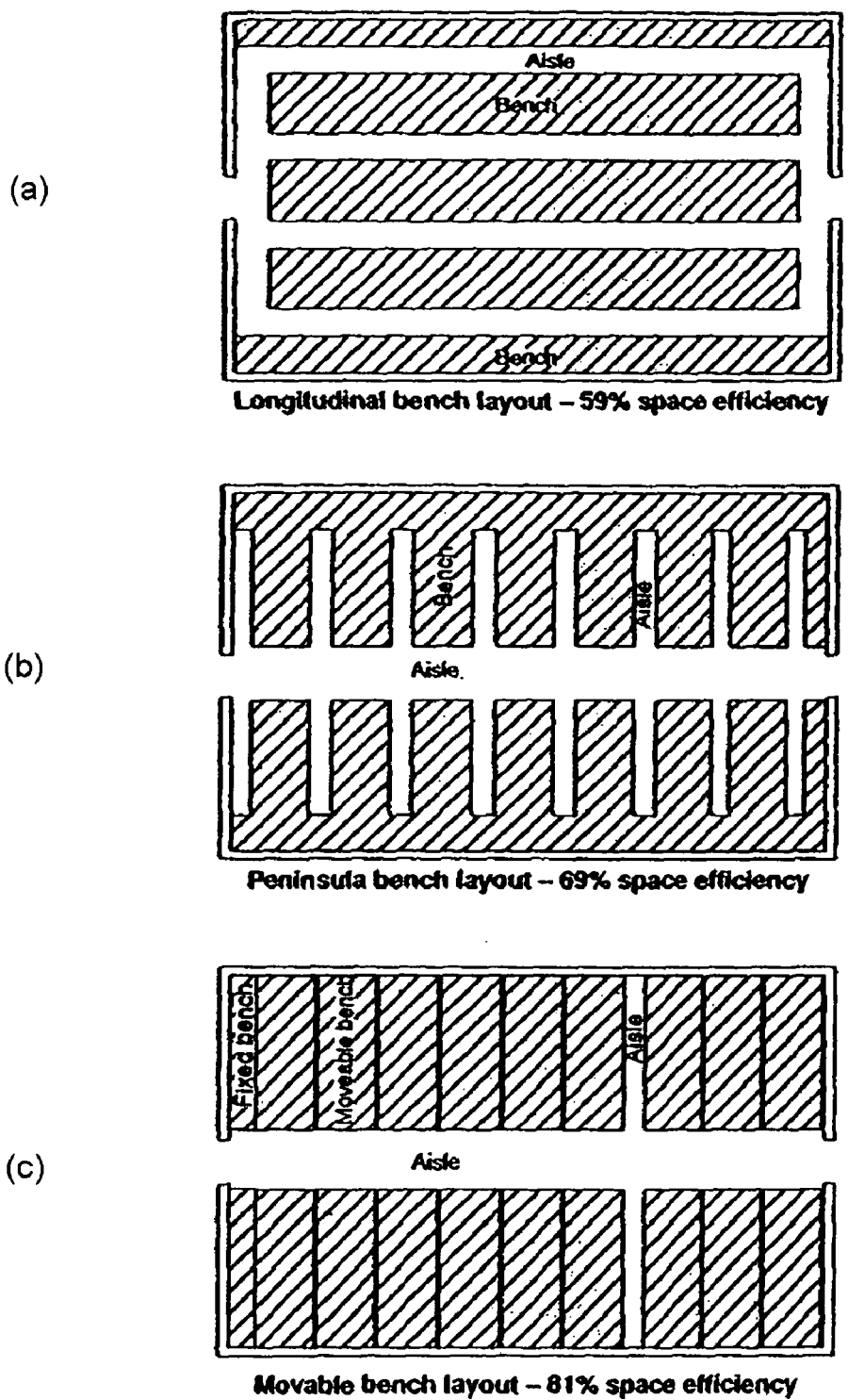
FIG. 1 include three drawings (a)–(c) of known ways of arranging benches in a greenhouse structure.
Figure 6C:
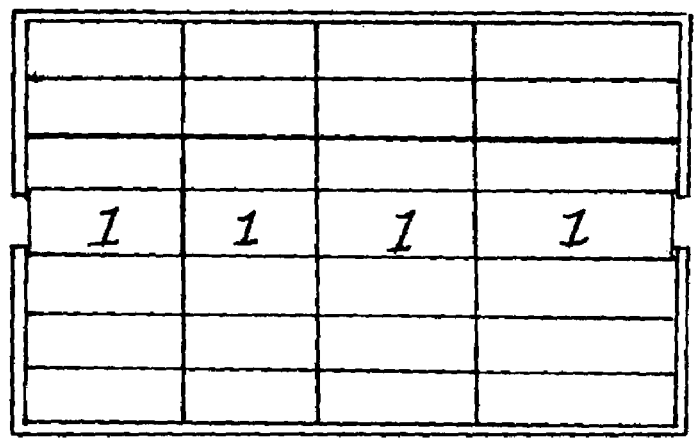
FIGS. 6(*a*) and (*b*) are views similar to FIG. 1(*c*), but with the addition of a plant bench according to the present invention, illustrated in a use position and a superposed position, respectively.
Figure 6D:
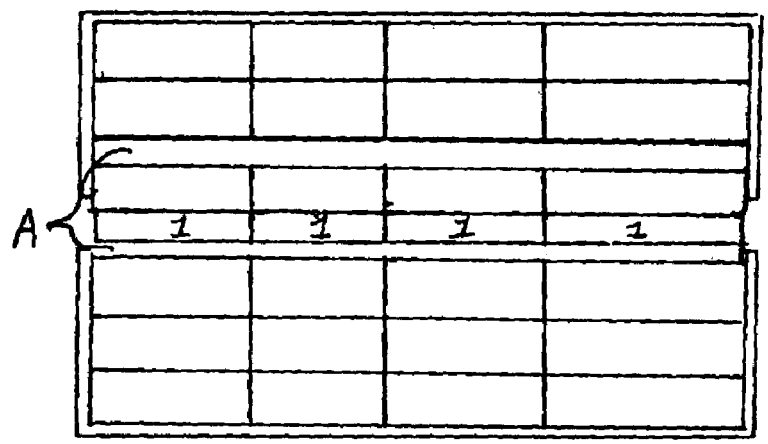

Turning to FIG. 6, implementation of the plant bench device according to the present invention in a greenhouse G is illustrated. FIGS. 6(*a*) and (*b*) correspond to a greenhouse as illustrated in FIG. 1(*c*), but with the addition of the plant bench device according to the present invention. As can be seen, four plant bench devices 1 occupy the central aisle. This allows the central aisle to be used for greenhouse operations.

When aisles are required for access to the plants on the benches in the greenhouse G, the plant benches according to the present invention are moved to the position illustrated in FIG. 4, as can be seen from FIG. 6(*b*). This allows, for example, two aisles to be created on either side thereof. Thus it can be seen that the efficiency of the use of space of even current greenhouse or nurseries can be improved by the addition of the present invention.

FIG. 6(*c*) illustrates a longitudinal greenhouse layout using movable benches on either side of a central aisle occupied by the plant bench devices 1 according to the present invention. After the plant bench devices 1 according to the present invention are moved to their superposed position illustrated in FIG. 4, two aisles A are created on either side thereof. The movable benches occupying the bulk of the greenhouse can then be moved in turn to sequentially create aisles A for access thereto, as illustrated for example by FIG. 6(*d*), in which one row of movable benches has been moved to create an inner aisle A.

The creation of the two aisles, for example two 24" aisles or two 18" aisles, allows for maintenance operations to be carried out. In the deployed position, when the plant bench tables are adjacent to each other, the floor space can be fully occupied. This efficiently utilizes, for example, overhead watering systems, etc. The majority of greenhouses are about 200' to 300' long, and the benches tend to run the entire length of the greenhouse. Employment of the present system allows the creation of the aisles running down the length of the greenhouse. 100% space utilization can be achieved by appropriate selection and use of the plant bench 1 according to the present invention. For example, the entire greenhouse floor could be occupied by benches 1 according to the present invention.

The plant bench device according to the present invention has been described in a general manner above. The following will discuss specific aspects as well as alternatives to the structural arrangement of FIGS. 2–5.

As an initial point, it will be noted that the drawing figures are schematic, and not intended to illustrate the specific dimensions of the device. Those of ordinary skill in the art will appreciate that appropriate dimensioning and disposition of the various components of the device will be necessary for structural integrity and operability.

The system may be powered in a number of ways. A motor 7 is schematically illustrated in FIG. 2. This motor 7, for example, might be fixed to the column 2 or any other suitable structure, as long as it is capable of rotating the rod 5 and the members 4 to move the tables 3 between the respective positions. Alternatives include, for example, a hand crank on the end of the rod 5, for example on the outside of one of the columns 2. Another alternative would be to have a connector suitable for engagement by a hand powered tool, such as a drill. If a hand crank or similar type of device is used, a set of retaining or "ratcheting dogs" may be needed to control the unbalanced weight of the two benches.

Figure 5:
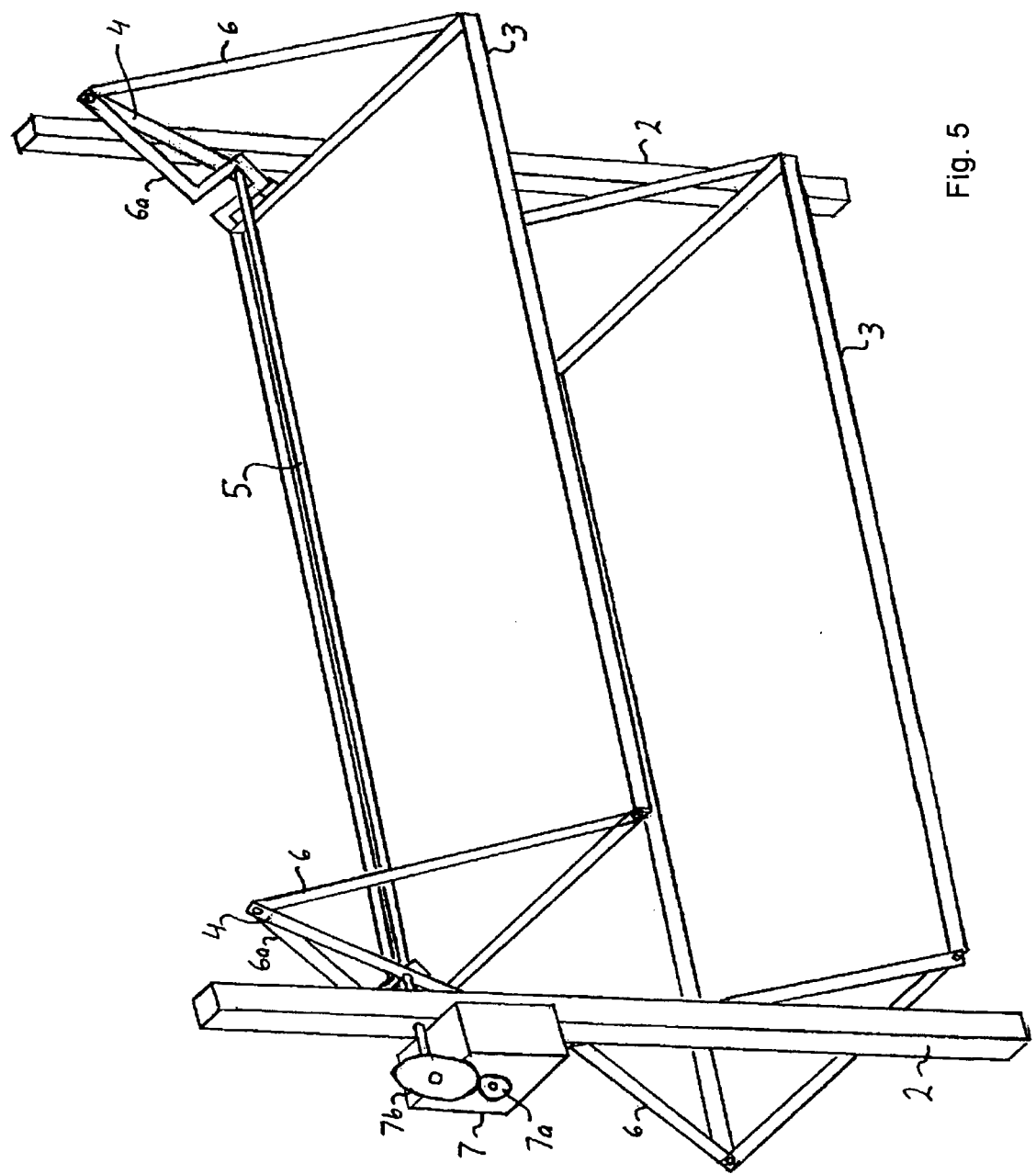
FIG. 5 is a perspective view of a plant bench according to the present invention.

When the tables 3 move from the position of FIG. 3 to the position of FIG. 4, the dimensions should be chosen so that the tables 3 do not interfere with the horizontal rod 5. Alternatively, an arrangement such as illustrated in FIG. 5 can be utilized to address this problem.

Each of the tables 3 is, for example, a 4'×8' table made of, for example, extruded aluminum, with an expanded aluminum table face to support the plant containers. Basically, however, the sizes may vary. What is of course necessary is that sufficient strength be provided. Both stainless steel and aluminum are suitable. However, stainless steel is somewhat expensive. For a size of 48" by 98" bench, $3/16$ aluminum is suitable. The bench itself otherwise corresponds to a typical nursery or greenhouse bench structure. Its strength must be sufficient to support the expected weight of the plants, water, etc., on the order of 200 lbs/bench for a 4'×8' bench.

As illustrated, the device 1 is essentially fixed in the greenhouse between floor and ceiling. However, it may be more advantageous for the device to be independently mounted on casters, without floor or ceiling support.

The column may also be suspended from the ceiling. In that case it may require a stabilizer bar to the floor in order counteract the torque. However, securing the column 2 in the concrete floor is the most cost effective way of securing the columns 2 in a fixed installation. As also discussed above, an alternative is to provide the column 2 on casters, with two casters spaced apart at each end along a bar supporting the column 2. For example, each column support would have two 5" heavy duty casters with a locking device.

The ideal fixed installation has the columns, for example 2"×4"×8' columns, set in a suitable recessed pocket in the building floor. Alternatively, they could be secured to the floor with a 2"×4"×4' foot that is already fixed to the floor or to the 5" casters.

The supports 6 which suspend the tables 3 from the ends of the members 4 must obviously be chosen to be able to support the required weight. They should be connected to the ends of the members 4 so they can freely pivot thereon in order to maintain the tables 3 horizontal during movement. While this is the simplest way of accomplishing the invention, known mechanisms could also be employed in order to maintain the tables 3 horizontal during movement.

It has been found that with benches of a larger size, with approximately 320 lbs/bench, about 640 foot pounds of torque is required on the main shaft (rod 5), which means that it should be of at least 1" diameter. One way to accomplish the drive is to use a 60 to 1 (or as necessary for variable bench loading) gear reduction unit driven by a 2 to 1 set of gears. While a motor is preferable, power, as noted, can also be by hand crank mechanism, or even by a variable speed ½" or larger electric drill driving a hex coupling on a gear box input shaft.

FIG. 5 represents a perspective view of a bench roll over device in accordance with the present invention. As can be seen, the motor 7 can be provided with a transmission including gears 7a and 7b. As discussed above, a 60 to 1 gear reduction unit can be incorporated in the motor, and the gears 7a and 7b can be a set of 2 to 1 gears. Gear 7b is appropriately mounted on an end of rod 5 so that the rod 5 can rotate the members 4 to move the tables 3 between the respective positions.

In the embodiment illustrated in FIG. 5, rotation from the position in which the tables 3 are substantially coplanar to the position in which they are substantially superposed involves potential interference between supports 6 and the rod 5. One simple way to deal with this is to provide a support 6a that is effectively bent inward to provide a recess for the rod 5, as illustrated. Both of the supports 6a would have the same recess.

While the recesses illustrated in supports 6a are square brackets, a "boomerang" or curved shape may be preferable. The supports 6a could also have an angled shape, for example each comprising two straight parts meeting at an obtuse angle sufficient to allow space for the rod 5. An example of this is shown in FIG. 5a, which is a simplified cross sectional view of a table 3 being rotated to the upper position by the members 4.

Figure 5A:
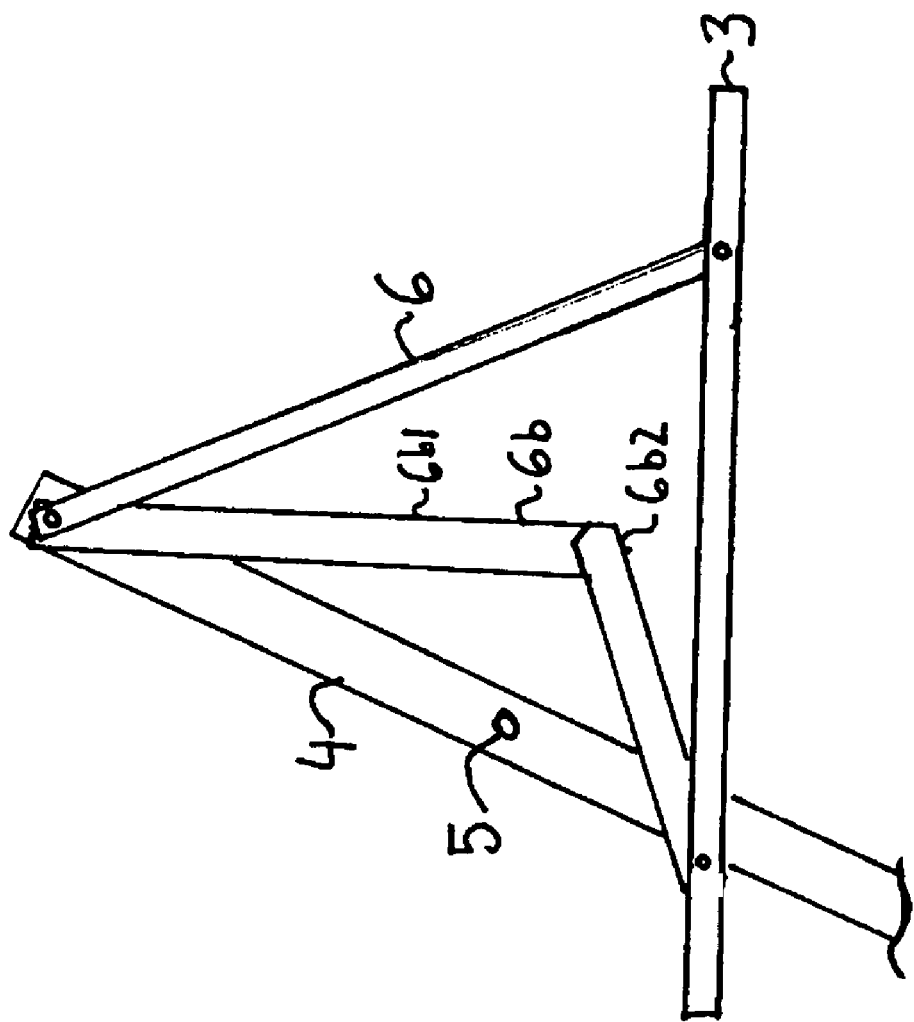
FIG. 5a is a detail view of a modification of one part of the plant bench.

Referring to FIG. 5a, a support 6b is made up of two straight parts 6b1 and 6b2 welded together at an angle. The angle allows the table 3 to be rotated by the members 4 to an upper position by two angled supports 6b being employed, one at either end, and with the angle forming a recess to receive the rod 5 that extends the length of the table. Angled supports 6b could be employed with both tables 3 of the plant bench 1 to allow for either table to be rotated to the upper position, though this is not illustrated.

The angled supports 6b are preferred, though simple square brackets can, nonetheless, be less expensive to fabricate.

While a number of options have been discussed above, further changes within the scope of the present description and the accompanying claims will be apparent to those with skill in the art. For example, various changes and modifications will be apparent to those of skill in the art, and should be considered as part of this invention.

What is claimed is:

1. A rollover plant bench for use in a greenhouse or nursery structure in which a plurality of plant benches are to be positioned adjacent to each other, said rollover plant bench comprising:
   a support structure; and
   two plant bench tables supported on said support structure so as to be movable between a first position in which said two plant bench tables can be used for greenhouse or nursery operations and a second position in which said two plant bench tables are at least partially superposed;
   wherein a horizontal width occupied by said two plant bench tables is smaller in said second position than in said first position so that an aisle can be created between said rollover plant bench and an adjacent plant bench in use;
   wherein said two plant bench tables are each supported by a member pivotally mounted to said support structure for movement between said first position and said second position;
   wherein said support structure comprises two spaced apart columns having said two plant bench tables there between, a said member is pivotally mounted to each of said two columns, and each longitudinal end of said two plant bench tables is supported by one said member; and
   wherein a horizontal rod connects one said member on one of said two columns and another said member on the other of said two columns so that both the one said member and the other said member will pivot together.

2. The plant bench of claim 1, wherein each said longitudinal end of said two plant bench tables is suspended from the one said member so that said two plant bench tables stay substantially horizontal during movement between said first position and said second position.

3. The plant bench of claim 1, and further comprising a mechanism operable to pivot the one said member and the other said member.

4. The plant bench of claim 3, wherein said mechanism comprises a hand crank.

5. The plant bench of claim 3, wherein said mechanism comprises a motor.

6. The plant bench of claim 3, wherein said mechanism comprises a connector engageable by a power tool.

7. The plant bench of claim 1, wherein in said first position, said two plant bench tables are substantially adjacent and coplanar.

8. A plant greenhouse or nursery structure, comprising:
   a building structure defining a greenhouse or nursery area; and
   a plurality of plant benches in said area for holding plants, said plurality of plant benches being positioned adjacent each other such that no aisle is present between at least two of said plant benches;
   wherein the at least two of said plant benches includes at least one rollover bench that is in position adjacent to another of the at least two of said plant benches and is operable to create an aisle there between, said rollover bench comprising:
      a support structure, and
      two plant tables supported on said support structure so as to be movable between a first position, in which said two plant tables can be used for greenhouse or nursery operations, and a second position, in which said two plant tables are at least partially superposed,
      wherein a horizontal width occupied by said two plant tables is smaller in said second position than in said first position so as to form the aisle between the rollover bench and the other of the at least two of said plant benches.

9. The structure of claim 8, wherein said two plant bench tables are each supported by a member pivotally mounted to said support structure for movement between said first position and said second position.

10. The structure of claim 9, wherein said support structure comprises two spaced apart columns having said two plant bench tables there between, a said member is pivotally mounted to each of said two columns, and each longitudinal end of said two plant bench tables is supported by one said member.

11. The structure of claim 10, wherein each said longitudinal end of said two plant bench tables is suspended from the one said member so that said two plant bench tables stay substantially horizontal during movement between said first position and said second position.

12. The structure of claim 10, wherein a horizontal rod connects one said member on one of said two columns and another said member on the other of said two columns so that both the one said member and the other said member will pivot together.

13. The structure of claim 12, and further comprising a mechanism operable to pivot the one said member and the other said member.

14. The structure of claim 13, wherein said mechanism comprises a hand crank.

15. The structure of claim 13, wherein said mechanism comprises a motor.

16. The structure of claim 13, wherein said mechanism comprises a connector made to connect with a rotary power tool.

17. The structure of claim 8, wherein in said first position, said two plant bench tables are substantially adjacent and coplanar.

* * * * *